(12) United States Patent
Brewer et al.

(10) Patent No.: US 11,886,728 B2
(45) Date of Patent: Jan. 30, 2024

(54) UNDO CAPABILITY FOR MEMORY DEVICES

(71) Applicant: Micron Technology, Inc., Boise, ID (US)

(72) Inventors: Tony M. Brewer, Plano, TX (US); David Boles, Austin, TX (US); David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 26 days.

(21) Appl. No.: 17/836,529

(22) Filed: Jun. 9, 2022

(65) Prior Publication Data

US 2023/0060587 A1 Mar. 2, 2023

Related U.S. Application Data

(60) Provisional application No. 63/234,929, filed on Aug. 19, 2021, provisional application No. 63/233,051, filed on Aug. 13, 2021.

(51) Int. Cl.
*G06F 3/06* (2006.01)

(52) U.S. Cl.
CPC ............ *G06F 3/064* (2013.01); *G06F 3/0619* (2013.01); *G06F 3/0631* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 8,122,229 | B2 | 2/2012 | Wallach et al. |
| 8,156,307 | B2 | 4/2012 | Wallach et al. |
| 8,205,066 | B2 | 6/2012 | Brewer et al. |
| 8,423,745 | B1 | 4/2013 | Brewer |

(Continued)

FOREIGN PATENT DOCUMENTS

| KR | 20180030319 A | 3/2018 |
| KR | 20190113359 A | 10/2019 |

(Continued)

OTHER PUBLICATIONS

"International Application Serial No. PCT/US2021/056855, International Search Report dated Feb. 10, 2022", 3 pgs.

(Continued)

*Primary Examiner* — Elias Mamo
(74) *Attorney, Agent, or Firm* — Schwegman Lundberg & Woessner, P.A.

(57) ABSTRACT

Disclosed in some examples are methods, systems, memory devices, and machine-readable mediums that allows an application thread to indicate an undo logging operation when calculations are beginning that may need to be rolled back if a crash or other failure occurs. During the undo logging operation, memory writes an identified memory are done to a copy and the original value is preserved. If the undo logging operation is committed, then the copy becomes the correct value and may then be subsequently used in place of the original, or the value stored in the copy is copied to the original. If the undo logging operation is abandoned, the copy is not preserved and the value goes back to the original.

27 Claims, 12 Drawing Sheets

(56) References Cited

U.S. PATENT DOCUMENTS

| | | | |
|---|---|---|---|
| 8,484,166 B2* | 7/2013 | Gower | G06F 11/1474 707/684 |
| 8,516,021 B2 | 8/2013 | Aronovich et al. | |
| 8,561,037 B2 | 10/2013 | Brewer et al. | |
| 9,535,854 B2* | 1/2017 | Lashley | G06F 11/1474 |
| 9,678,839 B2* | 6/2017 | Ventura | G06F 11/2094 |
| 9,710,384 B2 | 7/2017 | Wallach et al. | |
| 9,875,042 B1 | 1/2018 | Natanzon et al. | |
| 9,959,061 B1 | 5/2018 | Natanzon et al. | |
| 10,042,579 B1 | 8/2018 | Natanzon | |
| 10,127,236 B1* | 11/2018 | Zhou | G06F 16/13 |
| 10,409,493 B1 | 9/2019 | Kucherov et al. | |
| 10,664,358 B1 | 5/2020 | Chen et al. | |
| 10,990,391 B2 | 4/2021 | Brewer | |
| 10,990,392 B2 | 4/2021 | Brewer | |
| 11,321,006 B1 | 5/2022 | Grunwald et al. | |
| 11,693,593 B2 | 7/2023 | Roberts et al. | |
| 2008/0270708 A1 | 10/2008 | Warner et al. | |
| 2011/0302136 A1 | 12/2011 | Lakshminath et al. | |
| 2011/0314071 A1* | 12/2011 | Johnson | G06F 16/13 707/827 |
| 2012/0079177 A1 | 3/2012 | Brewer et al. | |
| 2012/0158680 A1 | 6/2012 | Shaughnessy | |
| 2013/0138892 A1 | 5/2013 | Loh et al. | |
| 2013/0332711 A1 | 12/2013 | Leidel et al. | |
| 2014/0082322 A1 | 3/2014 | Loh et al. | |
| 2014/0258660 A1 | 9/2014 | Cheriton | |
| 2015/0143350 A1 | 5/2015 | Brewer | |
| 2015/0206561 A1 | 7/2015 | Brewer et al. | |
| 2016/0077922 A1 | 3/2016 | Yoon et al. | |
| 2016/0085585 A1 | 3/2016 | Chen et al. | |
| 2016/0147786 A1* | 5/2016 | Andrei | G06F 16/2358 707/695 |
| 2016/0328153 A1 | 11/2016 | Krause | |
| 2017/0185294 A1 | 6/2017 | Moon et al. | |
| 2018/0074748 A1 | 3/2018 | Makin et al. | |
| 2018/0253468 A1 | 9/2018 | Gurajada et al. | |
| 2018/0260324 A1 | 9/2018 | Marathe et al. | |
| 2019/0042214 A1 | 2/2019 | Brewer | |
| 2019/0171604 A1 | 6/2019 | Brewer | |
| 2019/0205244 A1 | 7/2019 | Smith | |
| 2019/0243700 A1 | 8/2019 | Brewer | |
| 2019/0303154 A1 | 10/2019 | Brewer | |
| 2019/0324928 A1 | 10/2019 | Brewer | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0026698 A1 | 1/2020 | Benke et al. | |
| 2020/0372163 A1 | 11/2020 | Chung | |
| 2021/0055964 A1 | 2/2021 | Brewer | |
| 2021/0064374 A1 | 3/2021 | Brewer | |
| 2021/0064435 A1 | 3/2021 | Brewer | |
| 2021/0149600 A1 | 5/2021 | Brewer | |
| 2022/0019366 A1 | 1/2022 | Freilich et al. | |
| 2022/0103622 A1 | 3/2022 | Camargos et al. | |
| 2022/0129196 A1 | 4/2022 | Roberts et al. | |
| 2023/0137525 A1 | 5/2023 | Karr | |

FOREIGN PATENT DOCUMENTS

| | | |
|---|---|---|
| WO | WO-2010051167 A1 | 5/2010 |
| WO | WO-2013184380 A2 | 12/2013 |
| WO | WO-2019191740 A1 | 10/2019 |
| WO | WO-2019191742 A1 | 10/2019 |
| WO | WO-2019191744 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |
| WO | WO-2022093961 A1 | 5/2022 |
| WO | WO-2023018470 A1 | 2/2023 |

OTHER PUBLICATIONS

"International Application Serial No. PCT/US2021/056855, Written Opinion dated Feb. 10, 2022", 5 pgs.

"International Application Serial No. PCT/US2022/032812, International Search Report dated Sep. 23, 2022", 3 pgs.

"International Application Serial No. PCT/US2022/032812, Written Opinion dated Sep. 23, 2022", 4 pgs.

Chou, Chiachen, et al., "CAMEO:A Two-Level Memory Organization with Capacity of Main Memory and Flexibility of Hardware-Managed Cache", 2014 47th Annual IEEE/ACM International Symposium on Microarchitecture, (2014), 12 pgs.

Dong, X, et al., "Leveraging 3D PCRAM technologies to reduce checkpoint overhead for future exascale systems", Proceedings of the Conference on High Performance Computing Networking, Storage and Analysis, (2009), 13 pgs.

Leis, V, et al., "Exploiting hardware transactional memory in main-memory databases", IEEE 30th International Conference on Data Engineering, (2014), 12 pgs.

Seshadri, Vivek, et al., "RowClone: Fast and Energy-Efficient In-DRAM Bulk Data Copy and Initialization", 2013 46th Annual IEEE/ACM International Symposium on Microarchitecture (MICRO), (2013), 13 pgs.

"International Application Serial No. PCT/US2021/056855, International Preliminary Report on Patentability dated May 11, 2023", 6 pgs.

U.S. Appl. No. 17/082,947, filed Oct. 28, 2020, Versioning Data Stored on Memory Device.

* cited by examiner

FIG. 7

UNDO CAPABILITY FOR MEMORY DEVICES

PRIORITY APPLICATIONS

This application claims the benefit of priority to U.S. Provisional Application Ser. No. 63/234,929, filed Aug. 19, 2021, and to U.S. Provisional Application Ser. No. 63/233,051, filed Aug. 13, 2021, both of which are incorporated herein by reference in their entirety.

GOVERNMENT RIGHTS

This invention was made with U.S. Government support under Agreement No. DE-AC05-76RL01830, awarded by the Pacific Northwest National Laboratory. The U.S. Government has certain rights in the invention.

TECHNICAL FIELD

Embodiments pertain to memory devices. Some embodiments pertain to reverting to a previous data value stored in a memory device upon abortion of an operation or a failure of the memory device or application.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 illustrates a flowchart of a method of processing an abort instruction or other failure of the undo logging operation according to some examples of the present disclosure.

DETAILED DESCRIPTION

Figure 1:
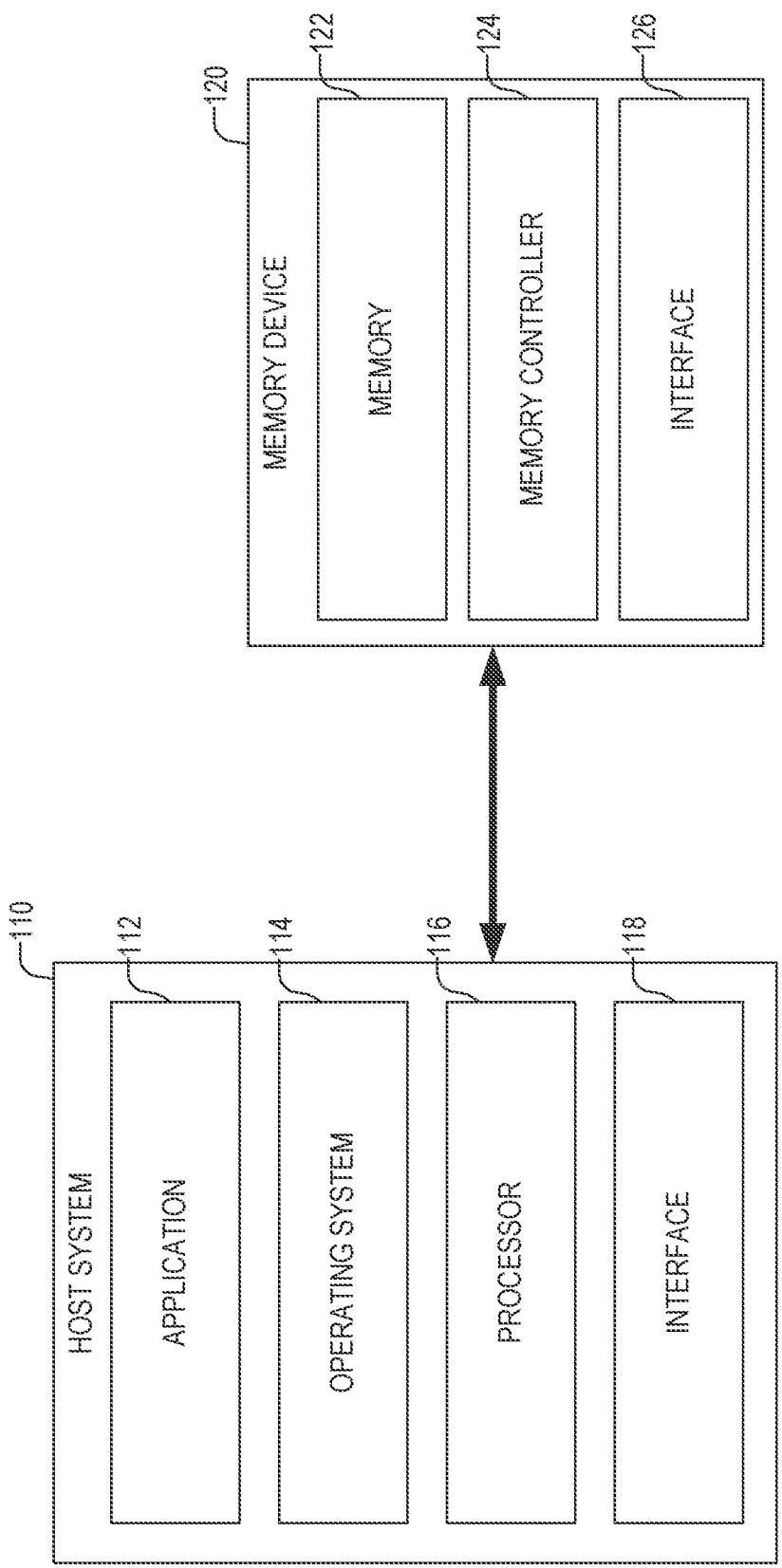
FIG. 1 illustrates an operating environment of a memory device according to some examples of the present disclosure.

The confluence of a number of factors such as an increase in speed (and decrease in latency) of memory devices such as storage class memory devices and other persistent memory devices in combination with their non-volatile properties; the increase in speed of computer busses (such as the Peripheral Component Interconnect Express (PCIe)); and other factors have led to the realization that such memory devices may be used more directly by other components of the host computer system. For example, Compute Express Links (CXL) may allow storage of the memory device to be shared across multiple components. For example, a storage class memory device may be used by the CPU in a manner similar to how a CPU uses RAM. CXL enables these usages through the PCIe physical and electrical interface with new protocols that allow memory and cache coherence between components.

These and other use cases of persistent memory create new challenges for applications executing on these systems. For example, in the past memory operations were completed in volatile RAM and then flushed to the non-volatile storage upon completion. This provided a method of performing computations in memory and only saving the resultant value when such calculations were successful or otherwise met a defined criteria. The use of non-volatile storage means that intermediate values may be stored to non-volatile storage at any point. As such, a power outage or other failure in mid-memory operation creates the possibility that the data stored in storage is in an intermediate state that is not valid. Such a state is difficult to detect and difficult to recover from without significant additional instructions and additional checks.

Disclosed in some examples are methods, systems, memory devices, and machine-readable mediums that allows an application to create an undo logging operation when memory operations may need to be rolled back if a crash or other failure occurs. The undo logging operation starts with the application providing a list of one or more memory locations. The memory state of those locations is saved until the application thread indicates that the undo logging operation is complete, and the memory modifications should be committed, or that the memory modifications should be discarded. During the undo logging operation, memory writes to a particular memory location in the list of one or more memory locations provided by the application are performed on a copy of the value and the original value is preserved. If the undo logging operation is committed, then the copy becomes the correct value and may then be subsequently used in place of the original, or the value stored in the copy is copied to the original. If the undo logging operation is abandoned, the copy is not preserved and the value goes back to the original.

Any memory blocks allocated for the undo logging operation may then be reclaimed after the operation is either committed or aborted. The amount of dynamically memory allocated may be related to the amount of memory modified, not the number of modifications, thus a single block that is modified, independent of the number of times it is modified, requires a single block to hold the original memory state. The disclosed methods thus have relatively low resource overhead. This contrasts with some solutions which may log each modification which may quickly use up a significant amount of memory resources. In addition, the time to start and complete an operation is proportional to the amount of memory used by the operation. In some examples, the memory for undo logging purposes is allocated to a process rather than from a system wide pool to prevent denial of service attacks that are inadvertent or intentional. The present disclosure thus solves the technical problem of data integrity for persistent memory devices by utilizing the technical solution of an undo logging operation that saves memory state from before the undo logging operation and uses metadata to control the undo logging operation.

Figure 10:
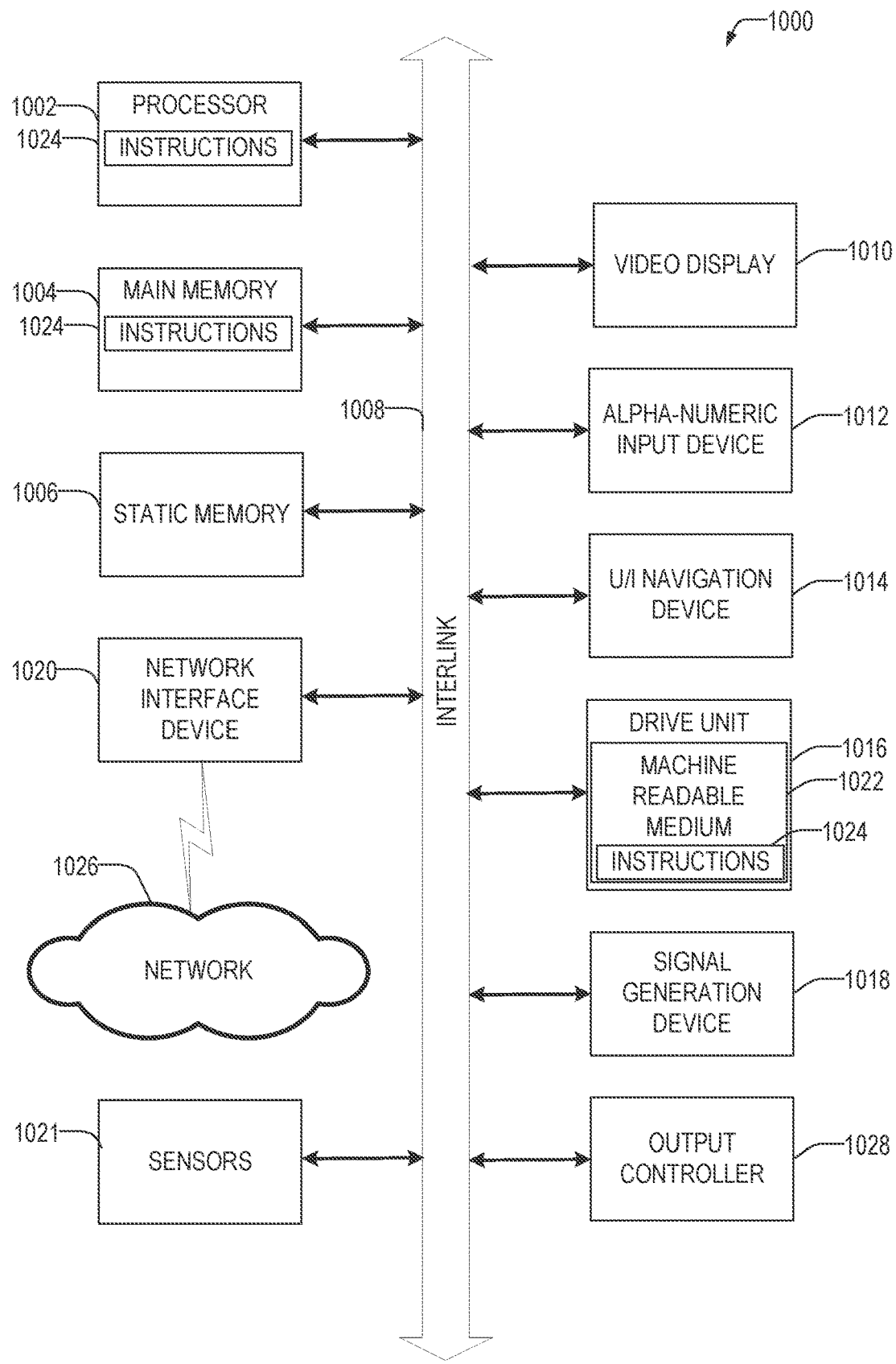
FIG. 10 is a block diagram illustrating an example of a machine upon which one or more embodiments may be implemented.

FIG. 1 illustrates an operating environment of a memory device 120 according to some examples of the present disclosure. Host system 110 may comprise, include components of, or be integrated into, a computing device, such as shown in FIG. 10. In some examples, the host system 110 may include a processor 116 (which may be an example of processor 1002 of FIG. 10). The processor 116 may include one or more caches, such as L1, L2, and/or L3 cache. Operating system 114 may interface with hardware of the host system such as the processor 116 and may provide one or more application programming interfaces (APIs) for applications, such as application 112 to interface with the hardware. Application 112 may perform one or more functionalities using the hardware and resources provided by the operating system 114. Interfaces 118 and 126 may be or manage a physical interface and may include one or more software and/or protocol implementations. Example interfaces may include a PCIe interface, a Universal Serial Bus interface, and the like (e.g., the interfaces 118 and 126 may be implemented across a or interconnect such as interlink 1008 of FIG. 10). Interface 118 and 126 may implement a PCIe interface, a CXL interface, and the like.

Memory device 120 may include memory 122, such as NAND storage, phase change memory, and the like. Memory 122 may be an example of main memory 1004, static memory 1006, or drive unit 1016. Memory controller 124 may be or include one or more processing units that may manage the memory 122 such as processor 1002 of FIG. 10. Memory controller 124 may have volatile storage for storage of data and instructions. For example, memory 1004 of FIG. 10. As an example, the memory controller 124 may include one or more logical to physical mapping tables that converts logical addresses into physical addresses on the memory 122. Other examples may include other management functions with respect to memory 122, such as garbage collection, error correction, and the like. The host system 110 and memory device 120 may implement an interface, such as a standard PCIe interface, a CXL interface, or the like across a physical interface or buss, such as a PCIe interface. As noted, the host system 110 may maintain cache and/or memory coherency between the host system 110 and memory device 120.

In some examples, all memory in the memory device may be used for the undo logging operations. In other examples, only certain regions of memory that are marked as eligible may be used for the undo logging operations. Regions that are eligible for undo logging operations may be marked using metadata, a flag, or the like. A region may be a contiguous range of physical addresses. Regions may be assigned to an application or set of applications during the execution of those applications. For example, one or more regions may be assigned to application 112 of FIG. 1. In some examples, multiple individual memory regions may be combined to form larger pools of memory. Memory regions may then be subdivided into one or more extents. Extents may be contiguous ranges of physical addresses within a region. Extents may be combined in a list and may have gaps between them. Extents may be software-requested memory objects that may be used during operations utilizing undo logging operations. In some examples, extents may be aligned on 64-byte (B) boundaries.

An application, such as application 112 may create an undo logging operation. For example, the application may call a function provided by an operating system, such as operating system 114 and/or provided by the memory controller 124. One example function may be of the form UndoLogging_start(vector of Extents). This function may return an operation identifier (undoID) that may be a unique identifier that identifies the undo logging operation. Upon calling the UndoLogging_start function, the system may validate that each of the extents passed in with the function is within a region where the undo logging feature is enabled (e.g., through a flag or other attribute associated with a memory region). In addition, the system may flush host cache lines that are in an exclusive or modified state back to the memory device for each extent in a newly created undo logging operation. For example, CXL devices may allow the processor 116 to exercise control over one or more memory locations of memory 122. In this state, the value stored in memory device 120 may not be up-to-date (e.g., a cached value may be more recent). By flushing the cache, all updates made by the processor 116 may be flushed back to the memory 122. Once complete, flushing the cache establishes a consistent starting snapshot for a recovery operation if necessary. In addition, the system may initialize bit fields for the extents that track the state of each memory line. Finally, the system may write a list of extents to persistent memory for crash cleanups.

Figure 2:
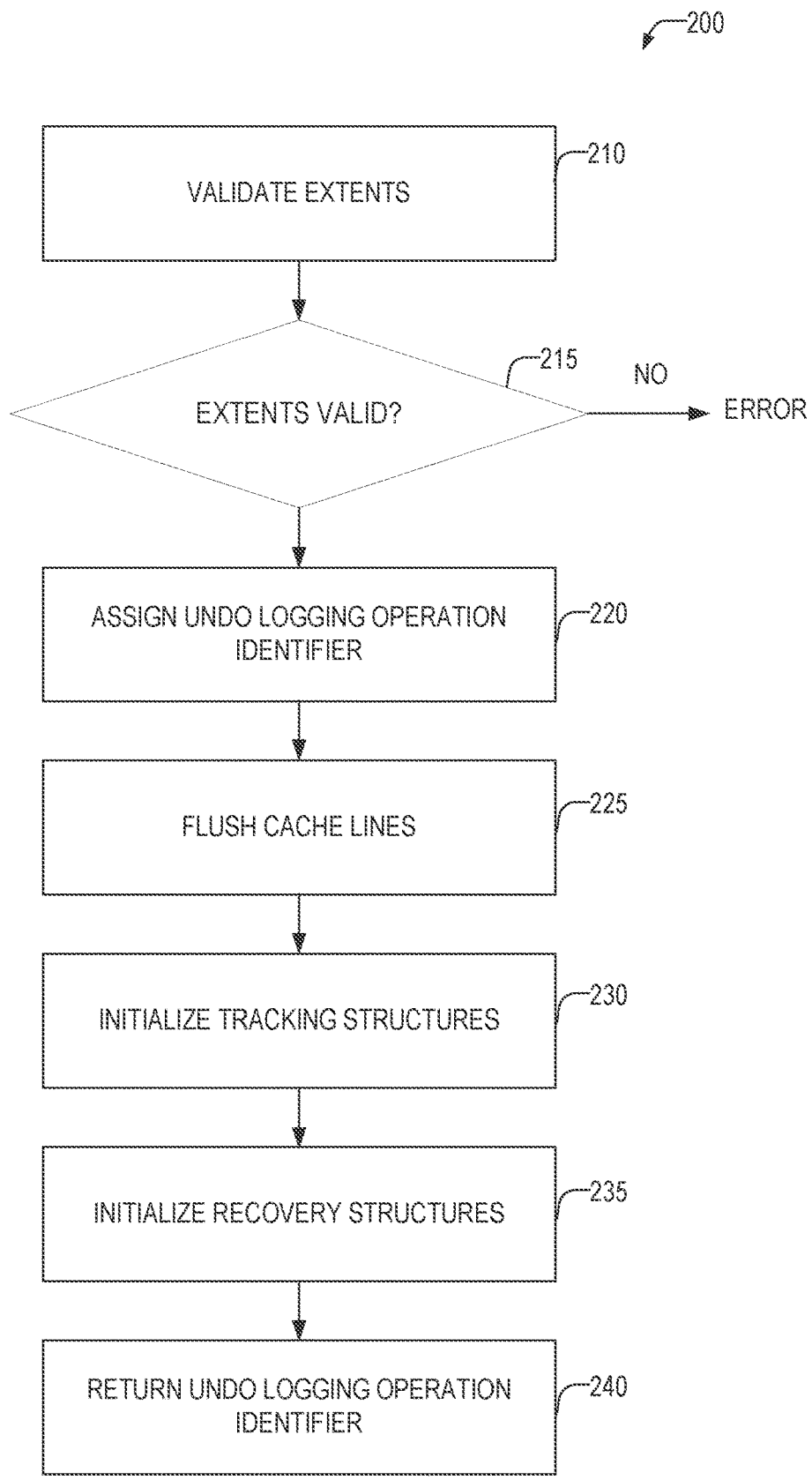
FIG. 2 illustrates a flowchart of a method of initializing an undo logging operation according to some examples of the present disclosure.

FIG. 2 illustrates a flowchart of a method 200 of initializing an undo logging operation according to some examples of the present disclosure. The method 200 may be performed by an operating system of a host, a controller of the memory device, portions may be performed by the host and other portions may be performed by the controller of the memory device, or the like. At operation 210 the system may validate the extents requested for the undo logging operation. For example, the method 200 may be started using a function call to an API called by an application executing on the host. The function call may include or otherwise specify one or more extents. The extents may be validated to ensure they are within memory regions that are configured to support undo logging operations. If, at operation 215, one or more of the extents are not valid, then the system returns an error. If the extents are valid, then at operation 220, an undo logging operation identifier is assigned. The operation identifier may be a unique identifier of the undo logging operation. The identifier may be unique to the whole system (including the host and other memory devices) or may be unique to the memory device.

At operation 225, for each memory line that is associated with the extents passed in with the function call that is currently indicated as in an exclusive or modified state (e.g., a CXL device), the memory line is flushed. In some examples, this flush may be achieved using CXL coherency commands or host software instructions. This operation ensures that the memory device has updated and valid memory at the start of the undo command.

At operation 230, the tracking structures may be initialized. These include metadata and memory block points and are described in more detail with respect to FIGS. 3 and 4. At operation 235, recovery structures are initialized. These structures are used in the event of a power or other failure to undo all currently pending undo logging operations that have not been committed. These structures are described in more detail with respect to FIG. 8.

At operation 240, the call may return the undo logging operation identifier to the calling party (e.g., the application). The undo logging operation identifier may be used to reference this particular operation in later function calls or commands. For example, the system may allow an application to add extents to an operation by supplying additional extents and the undo logging operation identifier. In these examples, the system may validate the additional extents, flush the cache lines of the added extents, initialize tracking structures for the added extents, and add the extents to the recovery structures as described for the creation of the undo logging operation.

As noted, the system uses various tracking structures and initializes them (e.g., operation 230 of FIG. 2) during the creation of the undo logging operation. For example, each memory line of an extent involved in an undo logging operation may have 5 bits of associated metadata. For example:

T (Tracking) bit—Indicates that memory line is currently participating in an undo logging operation.

W (Writeable) bit—Tracks if the memory line is in host cache in writeable state

F (First Write) bit—Tracks if a line has been written since the undo logging operation began S (Select) bit—Records the starting (original) location for the line at the beginning of the operation. If a Mirror block (block B) had previously been allocated for a data block (block A), after an operation completes, the F bit can be cleared, and the original memory line can be left where it was to minimize data movement. The S bit identifies where the original "backup" copy of data resides, and cache line writes get redirected to the opposite block.

E (Error) bit—Records if the block pool was exhausted when writing a line. A read must return error (e.g., returns a CXL poison indication) to a requestor when this bit is set.

Furthermore, as noted, during an undo logging operation, each logical block of memory may have two associated physical memory blocks. One physical block holds the original value at the start of the undo logging operation and is used if the undo logging operation is rolled back in the case of failure or explicit operation abort (e.g., through a function call to abort). The other block is initialized to the value of the first physical block and stores changes made to the memory during the undo logging operation. This block stores the value to use if the undo logging operation is committed. As noted above, the select bit of the metadata indicates which block is the original value and which is the value as updated by memory operations during the undo logging operation. This allows for more efficient commits or rollbacks as the system just flips the bit to indicate which block is a valid value. That is, if the first block stores the initial state and the second block stores the state as the result of the memory operations performed while the undo logging operation is running—if the undo logging operation is committed, then the select bit will point to the second block. If, on the other hand, the application performs a rollback of the undo logging operation, then the select bit will point to the first block. Subsequent operations (whether within an undo logging operation or not) will be performed on the block indicated by the select bit.

The following table illustrates a memory line sequence and example values of each of the TWFSE bits that are set in response to various example memory operations. Note that the select bit is either a one or a zero depending on the result of a previous undo logging operation. If this is a first undo logging operation for a block in which this memory line is a part of, then this is likely to be initialized to a default value (either zero or one).

| T | W | F | S | E | Memory Operation | Description |
|---|---|---|---|---|---|---|
| 0 | X | 0 | X | 0 | — | Initial state prior to undo logging operation |
| 1 | 0 | 0 | X | 0 | UndoLogging_start | State after operation start is performed (Tracking, line recalled if needed, clean, A or B block present, no error) |
| 1 | 1 | 0 | X | 0 | Mem Read | Line accessed by Host for Write (host now has line in exclusive state) |
| 1 | 0 | 0 | X | 0 | — | Line evicted from Host without modification |
| 1 | 1 | 0 | X | 0 | Mem Read | Line Accessed by Host for Write |
| 1 | 0 | 1 | X | 0 | Mem Write | Line written back by Host (Second block allocated, S bit is complemented)* |
| 1 | 1 | 1 | X | 0 | Mem Read | Line Access by Host for Write |
| 1 | 0 | 1 | X | 0 | Mem Write | Line Evicted (with or without modification) |

*Note that, at first write, if the system does not have enough blocks to allocate the second block, the TWFSE will set the error bit (E) to 1.

Figure 3:
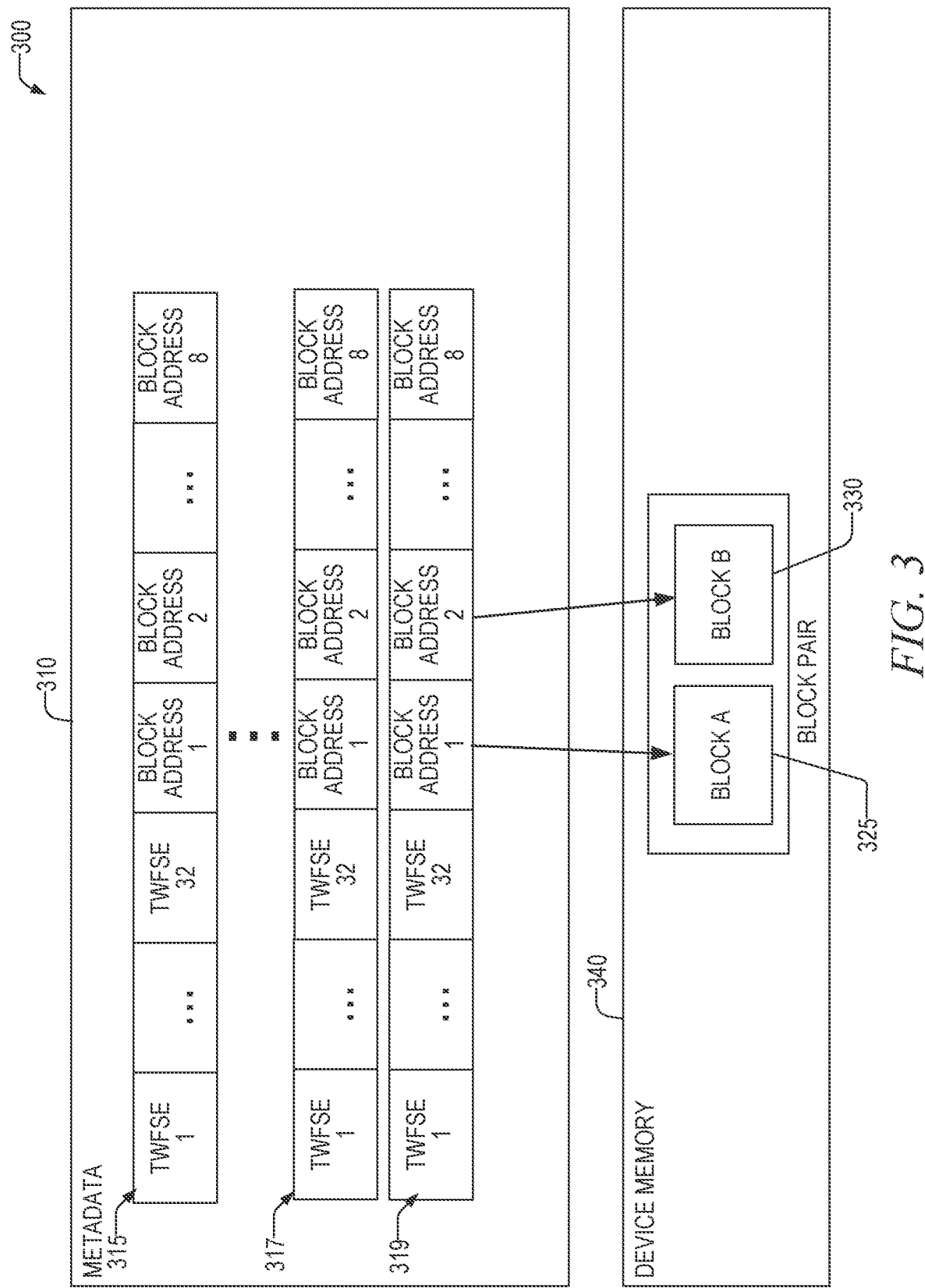
FIG. 3 illustrates a diagram of the metadata and the physical memory according to some examples of the present disclosure.
Figure 4:
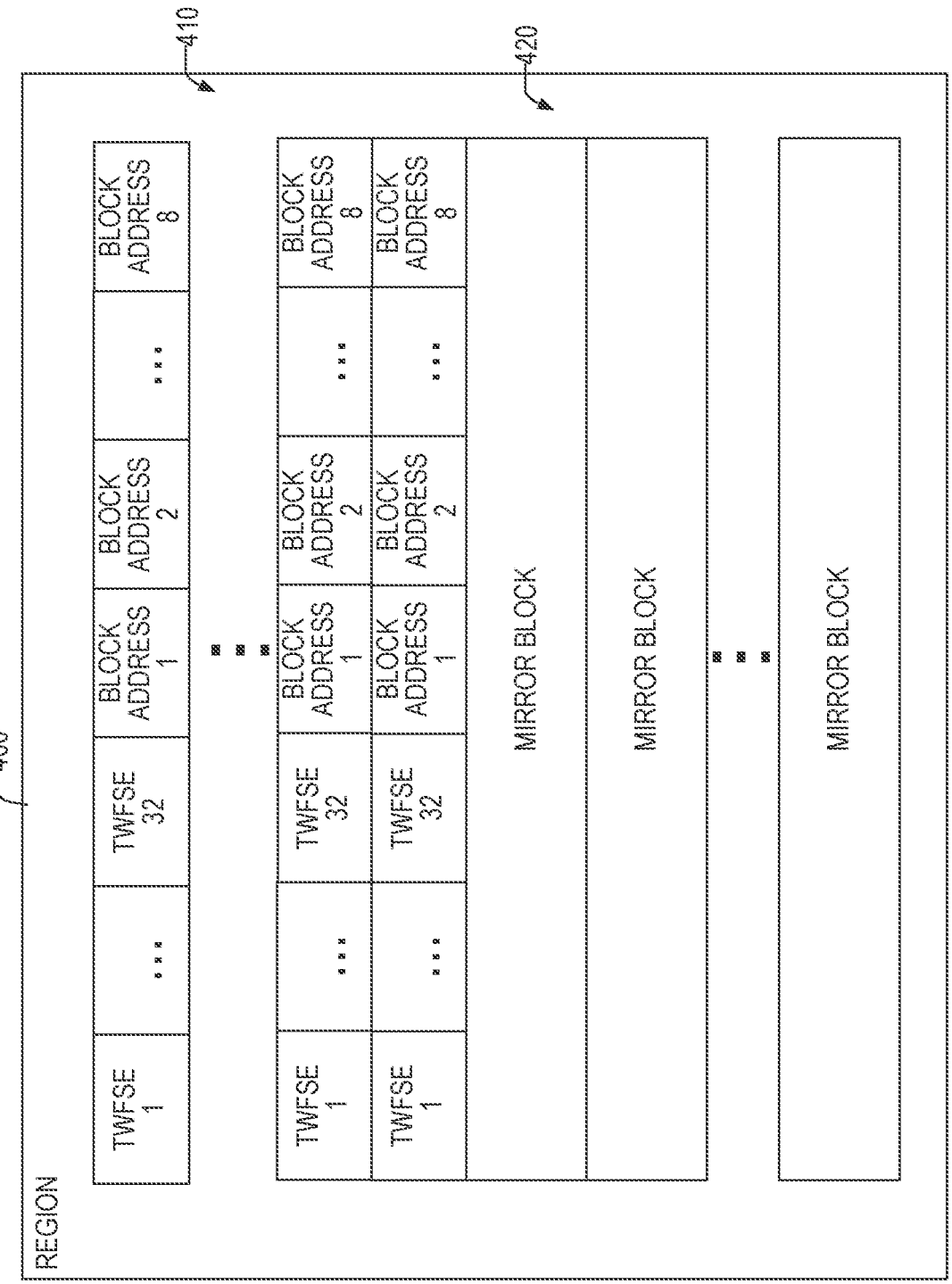
FIG. 4 illustrates the format of the region of memory according to some examples of the present disclosure.

FIG. 3 illustrates a diagram 300 of the metadata 310 and the physical memory 340 according to some examples of the present disclosure. Metadata data structures 315, 317, and 319 store state information for an undo logging operation. In the example of FIG. 3, each of the metadata data structures 315, 317, and 319 store metadata information for four 512B blocks of memory. Included in the metadata structures 315, 317, and 319 are TWFSE metadata. In some examples, separate TWFSE metadata may be stored for each memory line of each block. If a memory line is 64 B and a block is 512 B then there are eight TWFSE structures per block. As noted, in the Example of FIG. 3, each metadata data structure 315, 317, and 319 stores metadata for 4 blocks. Thus, there are 32 TWFSE structures (512 B per block/64 B per line=8*4 blocks per metadata structure) and 8 block address pointers (2 block address pointers per block*4 blocks) per metadata structure 315, 317, and 319. Each pair of block address pointers corresponds to a block. Thus, a first memory block may have two address pointers to physical addresses of one or more memory blocks in the device memory 340. For example, physical addresses of blocks 325 and 330. Blocks 325 and 330 form a block pair in which one block may be used to store values prior to the undo logging operation and the other block may store the values that result from memory operations executed during the undo logging operation. As noted, the select bit in the TWFSE may determine which of the blocks is used to store values prior to the undo logging operation and which block may store the values that result from the memory operations undertaken during the undo logging operation. FIG. 4 illustrates the format of the region of memory 400. The lower address range of the region 420 may be used as memory blocks and the upper region 410 for metadata.

Figure 5:
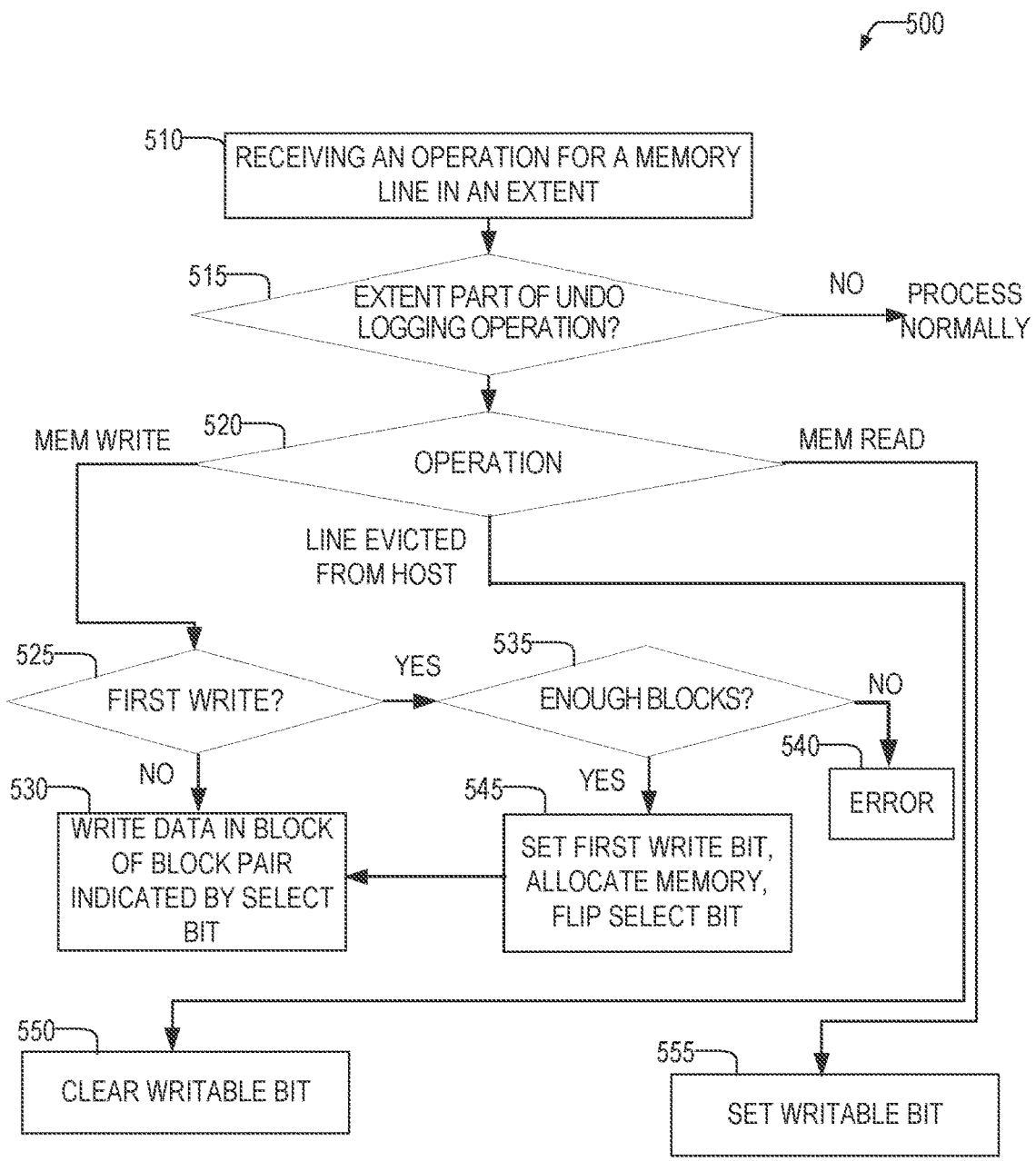
FIG. 5 illustrates a flowchart of a method of operation of the system during an undo logging operation according to some examples of the present disclosure.

FIG. 5 illustrates a flowchart of a method 500 of operation of the system during an undo logging operation according to some examples of the present disclosure. In some examples, the operations of FIG. 5 may be performed by a memory device, an operating system of a host, an application on the host, a combination of the aforementioned, or the like. At operation 510 the system receives an operation for a memory line of an extent. At operation 515 the system determines whether the extent is part of an undo logging operation. For example, the system may determine if the "tracking" bit of the TWFSE metadata is set for one or more memory lines of the extent. If not, then the system processes the request normally. If the extent is part of an active undo logging operation, then a determination is made at operation 520 what memory operation is requested. If the operation is a memory read—e.g., the line is being accessed by a host for a write, then at operation 555 the system may set the writeable bit in the TWFSE metadata.

If the line is evicted from the host without change, then at operation 550 the writeable bit is cleared. If the line is written back by the host, then at operation 525 it is determined whether the write is the first write to the memory line for the undo logging operation. If the write is the first write, then at operation 535 the system determines if there is enough memory to allocate a second block to hold the changes made during the undo logging operation. If not, then at operation 540 the system may indicate an error. For example, the system may set the error bit in the metadata and/or may raise an exception or other signal. If there are enough blocks, then at operation 545, the system may allocate another memory block, initialize the pointer in the metadata to point to the second block, set the first write bit, and flip the select bit so that new operations are performed in the newly allocated block. At operation 530, the data is written to the block of the block pair indicated by the select bit.

Figure 6:
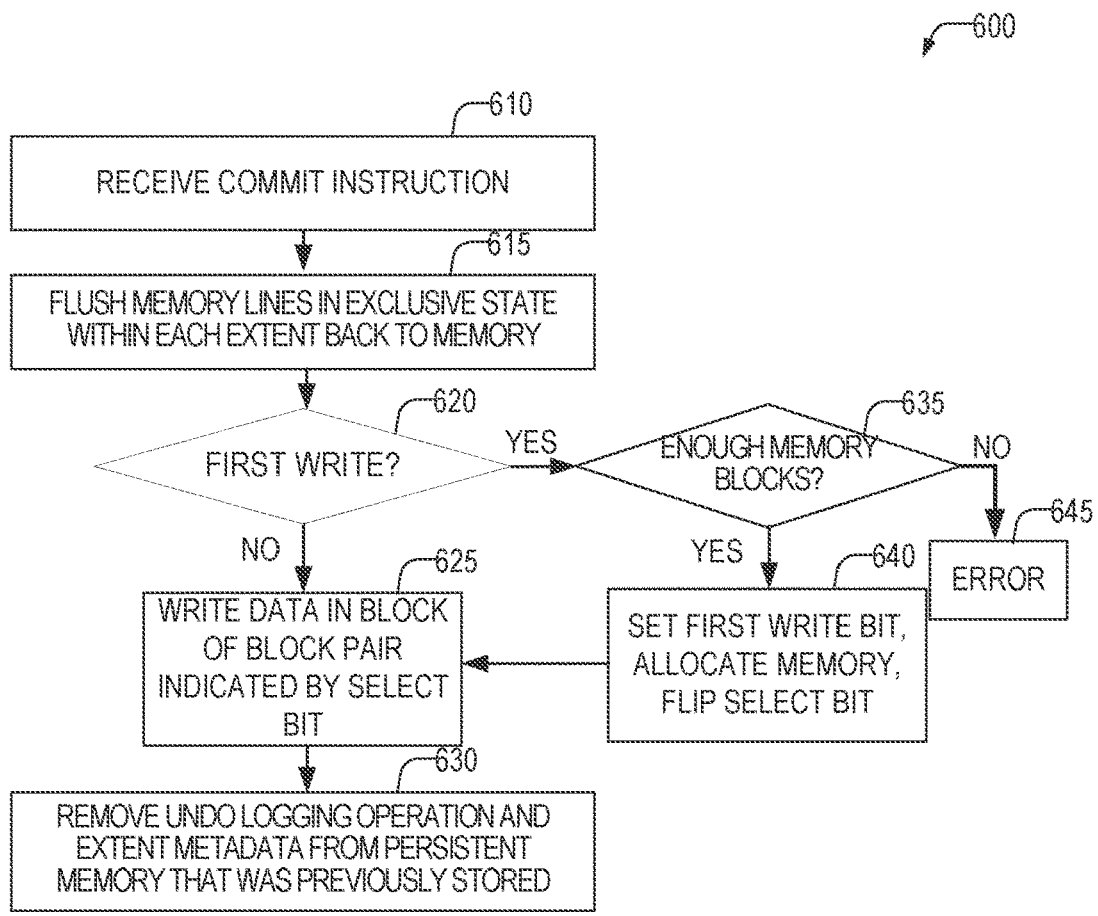
FIG. 6 illustrates a flowchart of a method of a commit instruction according to some examples of the present disclosure.

FIG. 6 illustrates a flowchart of a method 600 of a commit instruction according to some examples of the present disclosure. In some examples, the operations of FIG. 6 may be performed by a memory device, an operating system of a host, an application on the host, a combination of the aforementioned, or the like. The commit instruction causes the undo logging operation to terminate and the results of the memory operations conducted during the undo logging operation are considered the appropriate value of the memory block. The backup values stored in the matched memory block may be discarded and not used. At operation 610 the commit instruction is received. The commit instruction may be a function call, such as UndoLogging_commit (UndoID). The calling entity passes in the undo logging operation identifier. At operation 615 the memory lines in the exclusive state for each extent associated with the undo logging operation whose identifiers are specified are flushed back to memory (e.g., determined using the writeable bit of the TWFSE metadata). At operation 620, if the flush results in a first write to the memory line (e.g., if the memory line was previously unchanged until the flush at operation 615), then at operation 635, the system determines if there are enough memory blocks to allocate a new memory block. If there are not enough memory blocks then an error is returned at operation 645. If there are enough memory blocks, then at operation 640, the first write bit is set, the memory is allocated, and the select bit is flipped. At operation 625, the data is written to the block of the block pair indicated by the select bit. At operation 630, the system may remove the undo logging operation identifier and remove the extent metadata from persistent memory. Subsequent writes to the memory line will utilize the block of the block pair pointed to by the select bit. In some examples, the other block not pointed to by the select bit may be de-allocated for use in other undo procedures.

Figure 7:
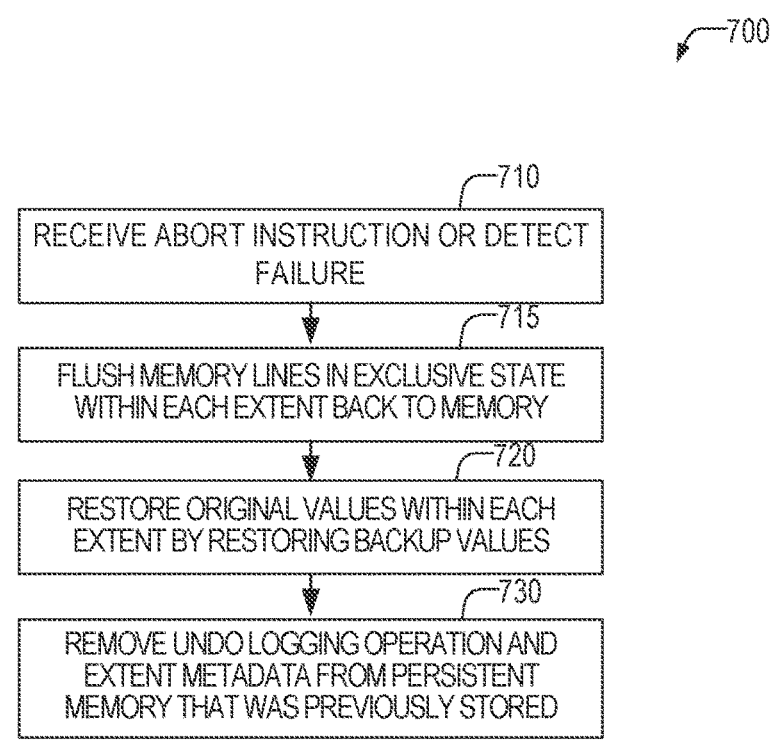

FIG. 7 illustrates a flowchart of a method 700 of processing an abort instruction or other failure of the undo logging operation according to some examples of the present disclosure. In some examples, the operations of FIG. 7 may be performed by a memory device, an operating system of a host, an application on the host, a combination of the aforementioned, or the like. At operation 710 the system may receive an abort instruction or otherwise detect a failure. In some examples, an abort undo logging operation may be initiated by a call to UndoLogging_abort(UndoID), or detection of a failure (e.g., a reset, a power loss, or the like). At operation 715, the system may flush memory lines in an exclusive state within each extent involved with the undo logging operation back to memory (e.g., the memory lines may be determined using the Writeable bit of the TWFSE metadata). This may ensure that any cached writes that resulted from operations executed during the undo logging operation do not change data after the undo logging operation is aborted. At operation 720, the system may restore the original values within each extent by restoring the backup values. In some examples, this may include copying the values in the block of the block pair that preserved the original state to the other block. In still other examples, this may include flipping the select bit. Subsequent memory accesses may be written to the memory block indicated by the select bit. At operation 730, the system may remove the undo logging operation by releasing the identifier and removing the extent metadata from persistent memory.

Note, that as the Block Size is reduced, the number of bits needed per pointer increases. In some examples, and as shown above, the metadata structure has sufficient space for 8 addresses plus up to 32 associated metadata bit fields per 64B memory line. The address bits per block pointer was calculated assuming a terabyte CXL device.

| BLOCK SIZE(B) | ADDRESS BITS | BLOCKS PER METADATA STRUCTURE | METADATA OVERHEAD % |
|---|---|---|---|
| 4096 | 28 | 2 | 0.78% |
| 2048 | 29 | 4 | 0.78% |
| 1024 | 30 | 4 | 1.56% |
| 512 | 31 | 4 | 3.13% |
| 256 | 32 | 4 | 6.25% |
| 128 | 33 | 4 | 12.50% |
| 64 | 34 | 4 | 25.00% |

As also noted, if the device runs out of space for allocating a block upon a first write, the application is notified using an interrupt, poison bit in a CXL response packet, or a memory-mapped status flag. The application may then decide what action to take. Example actions may include allocating more space, ending the operation, aborting the operation, or the like.

Figure 8:
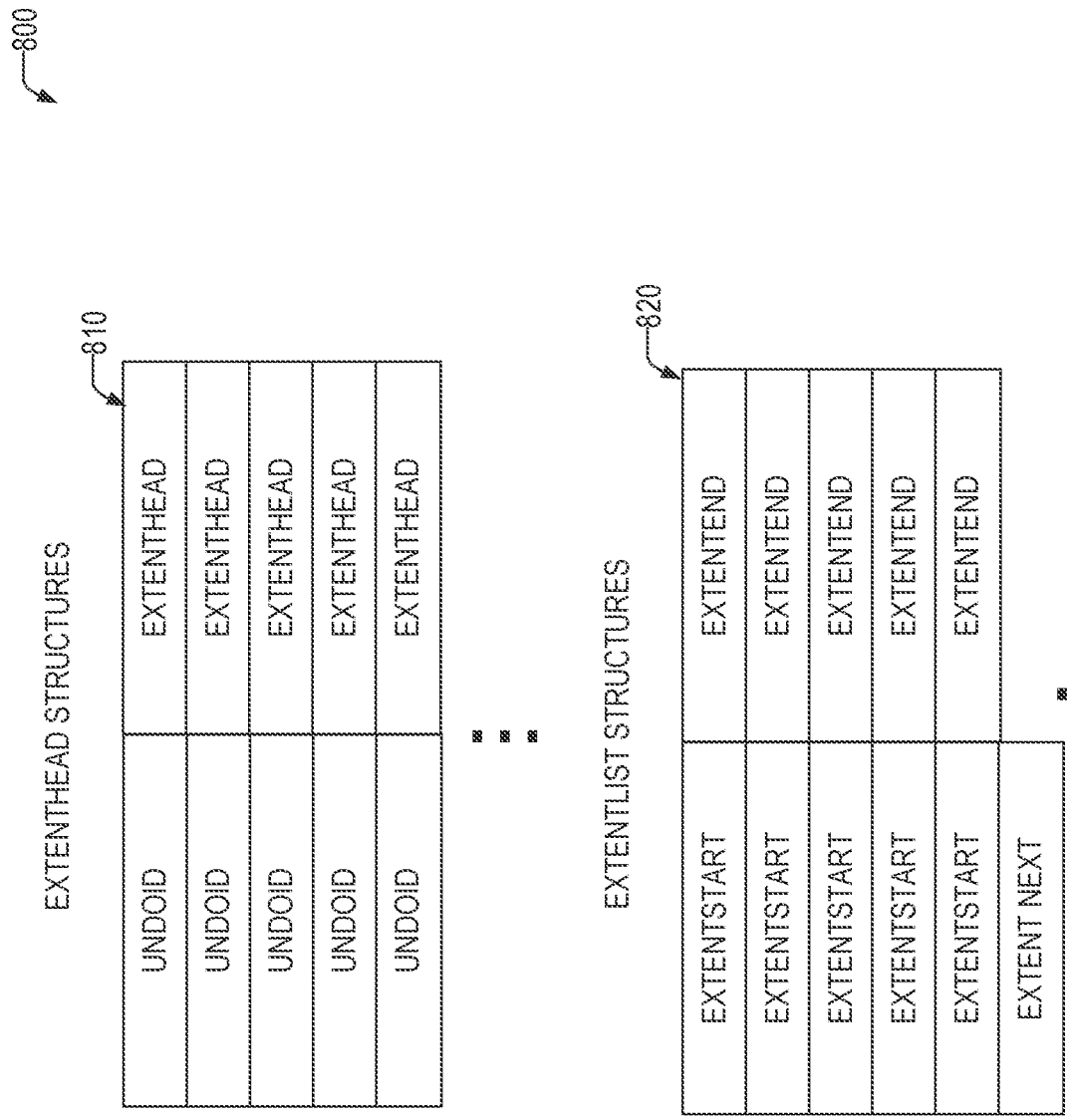
FIG. 8 illustrates an extent restore structure according to some examples of the present disclosure.

To survive power loss events, the list of Extents associated with Undo Logging IDs may be saved in persistent memory. In some examples, various data structures may be used to store this mapping. For example, FIG. 8 illustrates an Extent Restore Structure 800 according to some examples of the present disclosure. The structure has two sub-structures, ExtentHead 810 data structures and ExtentList 820 data structures. The ExtentHead 810 structure is a list of active operations needing to be restored, associating the undoID with a pointer to the head of an ExtentList 820 structure. An ExtentList 820 is a list of extents in active operations (containing start address and end address) for a particular undo logging operation. For efficiency, a 4B UndoID and 4B ExtentHead pointer field can be packed into 8B, allowing for an atomic swap for simplified list maintenance. For a 37-bit address offset (max. 128 GB Region size) for ExtentStart and ExtentEnd, a 64B cache line sized metadata block can store six complete extents along with a "next block" pointer called ExtentNext. An ExtentStart with all 1's may be unused, and an ExtentNext with all 1's may mark the end of the list.

Figure 9:
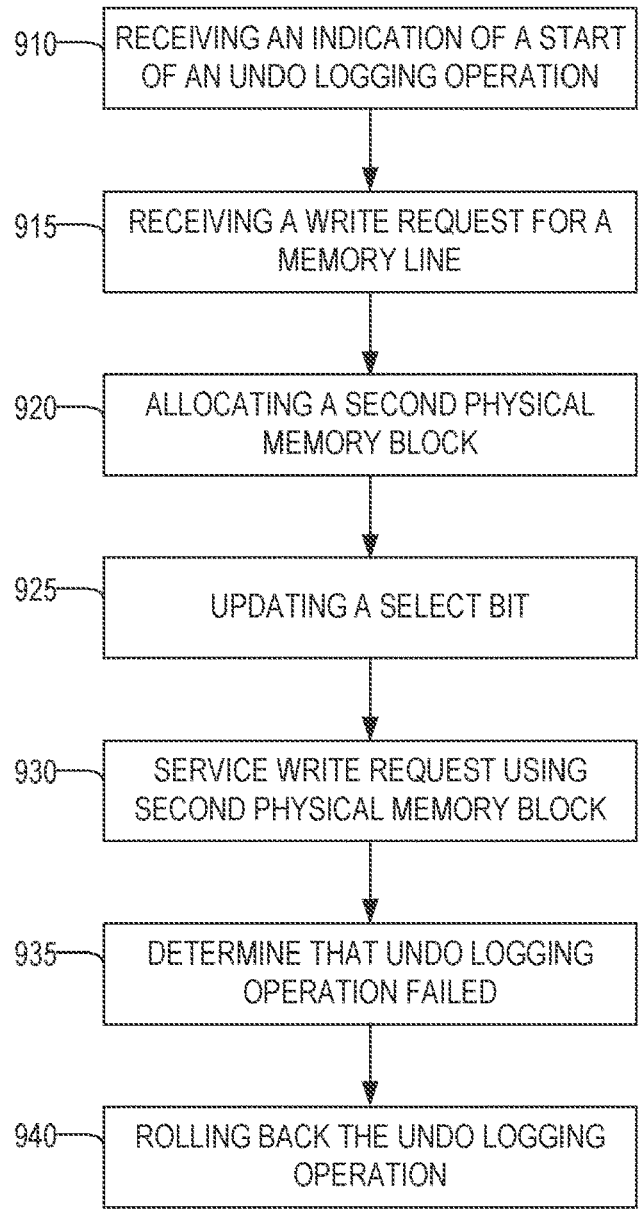
FIG. 9 illustrates a flowchart of a method of an undo logging operation according to some examples of the present disclosure.

FIG. 9 illustrates a flowchart of a method 900 of an undo logging operation according to some examples of the present disclosure. In some examples, the operations of FIG. 9 may be performed by a memory device, an operating system of a host, an application on the host, a combination of the aforementioned, or the like. At operation 910 the system may receive an indication of a start of an undo logging operation. For example, by receiving a function call from an application, such as a UndoLogging_start function call. The system may perform the operations of FIG. 2 responsive to operation 910. The application may supply a list of memory extents included in the undo logging operation.

At operation 915, the system may receive a write request for a memory line. In some examples, the system may determine whether the memory line is part of an extent included in an active undo logging operation. If the memory line is not included in the extent included in an active undo logging operation, the system may process the memory request as normal.

Responsive to detecting the write request for the memory line, the system may allocate, at operation 920, a second physical memory block of the memory device, for example, if this is a first write for any memory line assigned to the first physical memory block. At operation 925, metadata associated with the memory line may be updated to indicate that a first write operation has been done and to update a select bit, at operation 925 to indicate that memory requests are to be serviced at the first physical memory block to indicate that memory requests are to be serviced at the second physical memory block. For example, the select bit may be flipped from a one to a zero or from zero to one.

At operation 930, the system may service the write request received at operation 915 at the second physical memory block. In some examples, the value of the first memory block may be copied to the second memory block prior to operation 930. In some examples, no copy is necessary as the updated value is provided by the host. In some examples, the memory request may be preceded by a memory read operation that indicates that the memory line is accessed by the host for a write operation. The memory write request is then the command that writes the line back to memory by the host. In some examples, the Writable (W) bit may be cleared. In some examples, at this point, the memory stored in the second physical block is thus different, by virtue of the write request, then the first physical block. In some examples, operations 915-930 may correspond to operations 510, 515, 520, 525, 530, 535, and 545 of FIG. 5.

At operation 935, the system may determine that the undo logging operation failed. For example, an undo logging abort command may be received (e.g., FIG. 7), a power failure, a reset, or another error may be detected. At operation 940, the system may roll back the undo logging operation, for example, by performing the operations of 715-730. For example, by flipping the select bit of the meta data for all extents involved in the undo logging operation (assuming they have their first write bits indicated). In other examples, the contents of any second memory blocks may be copied to the first memory blocks.

As noted above, memory regions may have an undo logging attribute. Only memory allocated from regions with the undo logging attribute set may use the undo logging operation. Memory regions may be reserved as chunks of memory with a constant size (e.g. 256 MB, 4 GB, 16 GB, 64 GB or 256 GB), with a limited number per CXL device. In one example, enough space is reserved for a complete set of block pairs, i.e. a 50% capacity overhead. The proposed on-demand block allocation scheme limits the capacity overhead to only those pages written to after an undo logging operation begins. By not logging the write history of every address, the memory capacity requirement is bounded. Moreover, this architecture works equally well for small/short running transactions and large/long running transactions (e.g., checkpointing).

In some examples, there may be many extents that are involved in a particular undo logging operation. As previously described, when starting the operation, the system flushes cache lines. Additionally, when ending the undo logging operation the system may need to free the duplicate memory blocks created if the memory location was written to. Similarly, in the event of errors, the system may need to determine which memory lines had errors. In these examples, it may be resource intensive to parse through the metadata for each memory line of each extent to scan the metadata.

Figure 11:
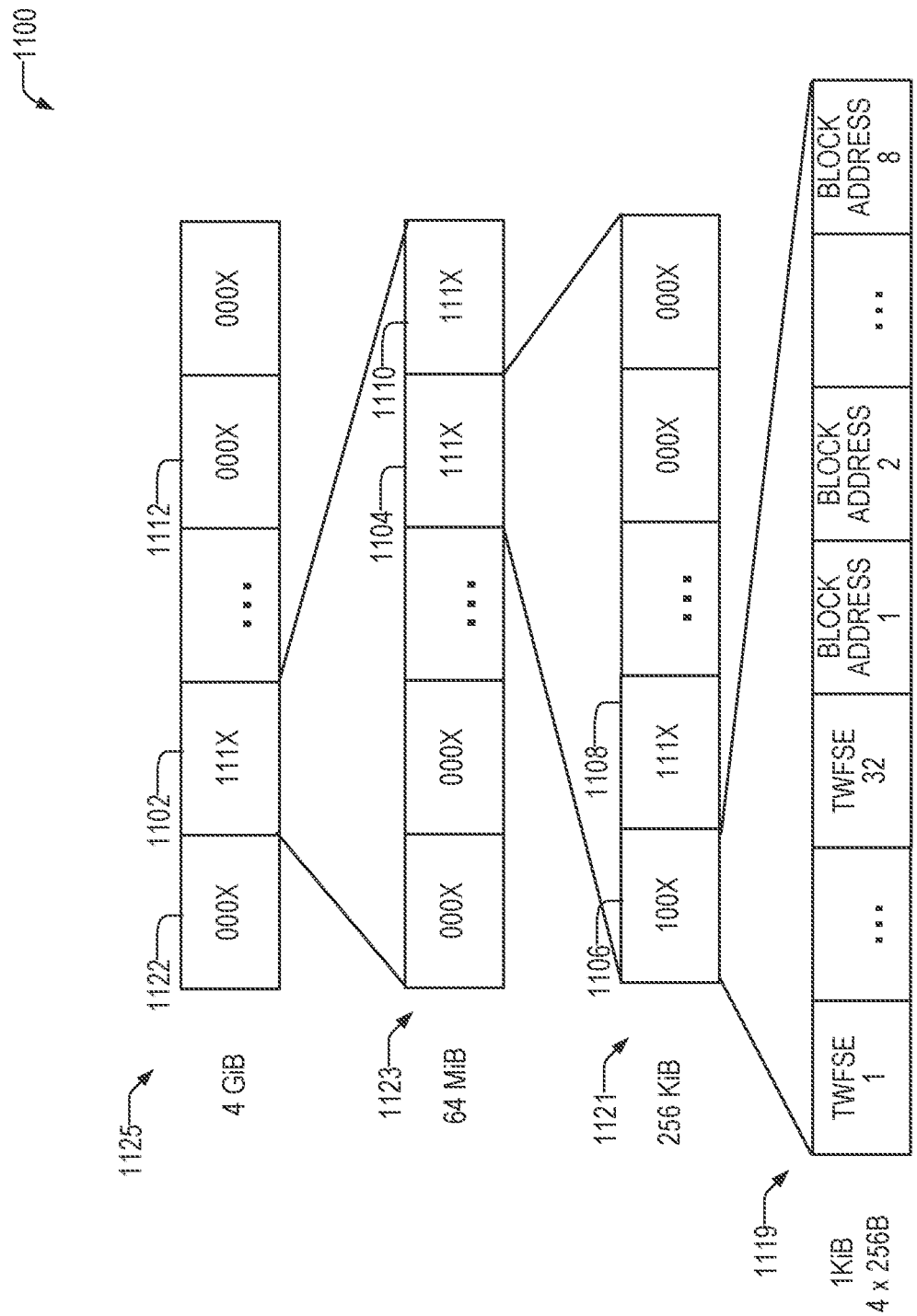
FIG. 11 illustrates a hierarchy of bit vectors according to some examples of the present disclosure.

In some examples, the system may maintain a hierarchy of bit vectors (e.g., a tree of bit vectors) that allows the system to quickly find memory lines that need to be flushed, have memory blocks to deallocate, or that have errors. FIG. 11 illustrates a hierarchy of bit vectors according to some examples of the present disclosure. By traversing the hierarchy (e.g., using a breadth first or depth first search), the system can rapidly determine which subsets of memory lines need to have various indicated actions taken. The lowest level of the hierarchy 1119 (layer 1) stores the TWFSE metadata per memory line plus eight block pointers as described in FIGS. 3 and 4. In some examples, the upper levels only require W, F, and E bits as the S bit is not used in deciding whether a region covered by a bit vector needs to have actions taken. In some examples, a spare bit for each level (e.g., so that the number of bits is a power of two) may be reserved for future use (indicated by the X in the figure).

The second layer in the hierarchy is a vector 1121 of four-bit cells. Each four-bit cell represents an entire 1 Kilobyte metadata structure 1119 at the lower level (layer 1). The value of the cell 1106 may be the logical OR of the WFE bits of each of the TWFSE bits of the metadata 1119. Likewise, a cell 1108 may represent the WFE bits of the TWFSE bits of a different 1 Kilobyte metadata structure that is not shown for clarity. Similarly the rest of the cells in the second layer similarly represent other metadata structures (again, these are not shown for clarity).

The third layer is also a vector 1123 of four-bit cells. Each four bit cell represents one layer 2 vector. That is, the cell 1104 represents layer 2 vector 1121. Similarly, cell 1110 represents another layer 2 vector (not shown for clarity). The value of the cell 1104 represents the logical OR of all the cell values of layer two vector 1121. Finally, the topmost layer is a vector 1125 of four-bit cells. Each four bit cell represents one layer 3 vector. That is, the cell 1102 represents layer 3 vector 1123. Similarly, cell 1112 represents another layer 3 vector (not shown for clarity). The value of the cell 1102 represents the logical OR of all the cell values of layer two vector 1123. While 4 levels are illustrated in FIG. 11, one of ordinary skill in the art will appreciate that more or fewer layers may be used.

The system may search for which memory lines need to be flushed before the start of an undo logging operation by starting at a top level vector 1125 and finding all the cells in the vector that have a '1' (or other value) in the writeable bit. For each cell that has a '1' in the writeable bit the system may process the vector corresponding to that cell for the next lower level. This continues until the system finds each memory line metadata structure at the bottom of the hierarchy. The system may then flush all the memory lines with the writeable bits set. This may be done for other operations such as finding memory lines that have experienced errors (using the error bit), or that need to have memory deallocated upon undo logging operation completion (using the first write bit). This minimizes the search effort to identify the set bits at the lowest levels. Rather than iterating through each metadata structure 1119 looking for lines that have bits that are set to the indicated value, the system may easily eliminate metadata structures that the system does not need to consider. For example, any metadata lines associated with a first cell 1122 may not need to be searched because the bits are all zeros. This may save computing resources when performing operations where the metadata may need to be searched.

When a bit in the metadata changes, for example, the first write bit, the error bit, or the writeable bit, the system may update the bit vector hierarchies. For example, if one of the writeable bits in the metadata structure 1119 is updated, the system may then traverse up the hierarchy and update the OR values of each level. For example, if metadata structure 1119 is updated, then the cells 1106, 1104, and 1102 may be updated.

Figure 12:
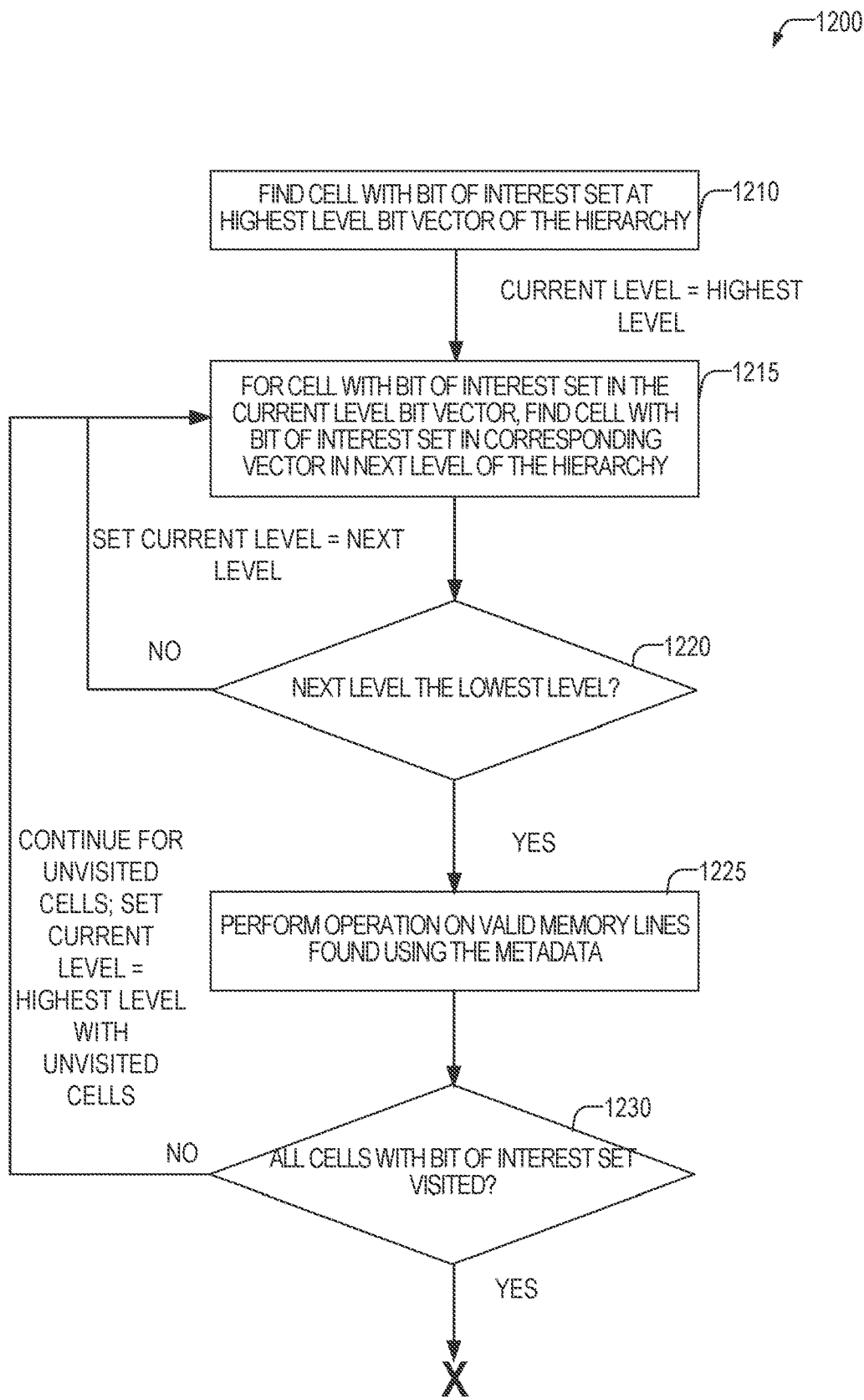
FIG. 12 illustrates a flowchart of a method of a traversal of the bit vector hierarchy according to some examples of the present disclosure.

FIG. 12 illustrates a flowchart of a method 1200 of a traversal of the bit vector hierarchy. The bit vector hierarchy may be searched using a breadth-first search or a depth first search. FIG. 12 illustrates traversing the hierarchy using a depth first search. FIG. 12 may be performed when the system is trying to determine which memory lines to perform a desired operation on such as flushing the cache, deallocating memory, finding errors, or the like. At operation 1210, the system may start at the highest level of the hierarchy and find a first cell in the bit vector of the highest level that has a bit of interest that is set to a desired value. The bit of interest may depend on the operation desired. For example, for flushing memory lines, the bit of interest may be the W bit, for finding errors the bit of interest may be the E bit, and for deallocating memory, the bit of interest may be the F bit. For example, if the W bit is the left-most bit in FIG. 11, the system would find cell 1102.

At operation 1215 for the cell with the bit of interest set in the highest level bit vector (found at operation 1210), the system may find a cell with a bit of interest set in the corresponding vector in the next lowest level of the hierarchy. For example, in FIG. 11, the system would search vector 1123 and select cell 1104 as it has a '1' set in the bit of interest (the W bit). At operation 1220, the system may determine if this next level is the lowest level (e.g., the metadata 1119). If not, the system repeats operation 1215 for a cell in the next lower level in the hierarchy. For example, the system would repeat operation 1215 on a vector represented by cell 1104 of FIG. 11 and select cell 1106. The system may again repeat operation 1215 for vector 1121 and find the TWFSE metadata in metadata structure 1119 and in particular the appropriate metadata blocks that have the W bit set. As the next level is the lowest level (e.g., the metadata blocks), the flow may proceed to the operation 1225 where the system performs the operation on each valid memory line found using the metadata. Once the system gets to the lowest level, at operation 1230 the system may determine whether all cells with a bit of interest that was set has been visited. If not, then flow proceeds to operation 1215 where the current level is the highest level with unvisited cells. For example, the system may process cell 1110 of vector 1123 from FIG. 11. Once all cells are visited and all operations are performed on all cells, then the operations of FIG. 12 may terminate.

While FIG. 12 started at the highest level of the hierarchy and proceeded in a depth-first search, in other examples, the system may use a breadth first search. In some examples, the system may start the search at lower levels in order to further speed up search time (whether conducted as a depth first search or a breadth first search). For example, the system may use the extent range and an offset to determine a level of the hierarchy to start at. The extent range is determined for the undo logging operation. This may be based upon the undo start instruction that specifies the extents. In some examples, the starting level may be the lowest level of the hierarchy in which the entire extent range may be represented by the bit vectors. For example, if the extent range for the undo logging operation is 512 consecutive Kilobytes of extents, and if the second level of the hierarchy represents 256 Kilobytes (as in FIG. 11) then the highest level of the bit vector hierarchy would be the bit level hierarchy above the 256 Kilobyte hierarchy (e.g., the level 1123 of FIG. 12).

FIG. 10 illustrates a block diagram of an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be in the form of a memory device, host device (such as a personal computer (PC), a tablet PC, a set-top box (STB), a personal digital assistant (PDA), a mobile telephone, a smart phone, a web appliance, a network router, switch or bridge), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The components of FIG. 10 are exemplary and fewer or additional components may be present in a memory device, a host device, or the like.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1000 may include one or more hardware processors, such as processor 1002. Processor 1002 may be a central processing unit (CPU), a graphics processing unit (GPU), a hardware processor core, or any combination thereof. Machine 1000 may include a main memory 1004 and a static memory 1006, some or all of which may communicate with each other via an interlink (e.g., bus) 1008. Examples of main memory 1004 may include Synchronous Dynamic Random-Access Memory (SDRAM), such as Double Data Rate memory, such as DDR4 or DDR5. Interlink 1008 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

OTHER NOTES AND EXAMPLES

Example 1 is a method comprising: receiving, from an application, an indication of a start of an undo logging operation, the indication of the start of the undo logging operation identifying a first physical memory block of a memory device, the first physical memory block addressed by one or more memory lines; responsive to receiving, from the application, the indication of the start of the undo logging operation: receiving a write request for a memory address range assigned to the first physical memory block of the memory device; responsive to the write request: allocating a second physical memory block of the memory device; updating at least one bit of a metadata data structure for the memory address range from indicating that memory requests are to be serviced at the first physical memory block to indicate that memory requests are to be serviced at the second physical memory block; and servicing the memory request for the memory address range using the second physical memory block; and determining that the undo logging operation failed; and responsive to determining that the undo logging operation failed, updating the at least one bit of the metadata data structure for the memory line from indicating that memory requests are to be serviced at the second physical memory block to indicate that memory requests are to be serviced at the first physical memory block.

In Example 2, the subject matter of Example 1 includes, wherein the memory device is a persistent memory device connected to a host using an interface configured for a Compute Express Link (CXL) protocol.

In Example 3, the subject matter of Examples 1-2 includes, wherein the method further comprises: responsive to receiving the indication of the start of the undo logging operation and prior to receiving the write request, causing a cache of the memory line of a host device to be flushed.

In Example 4, the subject matter of Example 3 includes, wherein the method further comprises, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

In Example 5, the subject matter of Example 4 includes, wherein traversing the bit vector hierarchy from the first level to the metadata structure for the memory line comprises traversing the bit vector hierarchy using one of a depth-first search or a breadth-first search.

In Example 6, the subject matter of Examples 1-5 includes, wherein determining that the undo logging operation failed comprises receiving an indication to abort the undo logging operation from the application.

In Example 7, the subject matter of Examples 1-6 includes, wherein determining that the undo logging operation failed comprises detecting a device reset prior to a committal operation of the undo logging operation.

In Example 8, the subject matter of Example 7 includes, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

In Example 9, the subject matter of Examples 1-8 includes, wherein the metadata data structure includes an identifier of whether the first or second physical block is a backup block.

Example 10 is a computing device comprising: a processor; a memory, storing instructions, which when executed by the processor causes the computing device to perform operations comprising: receiving, from an application, an indication of a start of an undo logging operation, the indication of the start of the undo logging operation identifying a first physical memory block of a memory device, the first physical memory block addressed by one or more memory lines; responsive to receiving, from the application, the indication of the start of the undo logging operation: receiving a write request for a memory address range assigned to the first physical memory block of the memory device; responsive to the write request: allocating a second physical memory block of the memory device; updating at least one bit of a metadata data structure for the memory address range from indicating that memory requests are to be serviced at the first physical memory block to indicate that memory requests are to be serviced at the second physical memory block; and servicing the memory request for the memory address range using the second physical memory block; and determining that the undo logging operation failed; and responsive to determining that the undo logging operation failed, updating the at least one bit metadata data structure for the memory line from indicating that memory requests are to be serviced at the second physical memory block to indicate that memory requests are to be serviced at the first physical memory block.

In Example 11, the subject matter of Example 10 includes, wherein the memory device is a persistent memory device connected to a host using an interface configured for a Compute Express Link (CXL) protocol.

In Example 12, the subject matter of Examples 10-11 includes, wherein the operations further comprise: responsive to receiving the indication of the start of the undo logging operation and prior to receiving the write request, causing a cache of the memory line of a host device to be flushed.

In Example 13, the subject matter of Example 12 includes, wherein the operations further comprise, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

In Example 14, the subject matter of Example 13 includes, wherein traversing the bit vector hierarchy from the first level to the metadata structure for the memory line comprises traversing the bit vector hierarchy using one of a depth-first search or a breadth-first search.

In Example 15, the subject matter of Examples 10-14 includes, wherein the operations of determining that the undo logging operation failed comprises receiving an indication to abort the undo logging operation from the application.

In Example 16, the subject matter of Examples 10-15 includes, wherein determining that the undo logging operation failed comprises detecting a device reset prior to a committal operation of the undo logging operation.

In Example 17, the subject matter of Example 16 includes, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

In Example 18, the subject matter of Examples 10-17 includes, wherein the metadata data structure includes an identifier of whether the first or second physical block is a backup block.

Example 19 is a non-transitory machine-readable medium, storing instructions, which when executed by a machine causes the machine to perform operations comprising: receiving, from an application, an indication of a start of an undo logging operation, the indication of the start of the undo logging operation identifying a first physical memory block of a memory device, the first physical memory block addressed by one or more memory lines; responsive to receiving, from the application, the indication of the start of the undo logging operation: receiving a write request for a memory address range assigned to the first physical memory block of the memory device; responsive to the write request: allocating a second physical memory block of the memory device; updating at least one bit of a metadata data structure for the memory address range from indicating that memory requests are to be serviced at the first physical memory block to indicate that memory requests are to be serviced at the second physical memory block; and servicing the memory request for the memory address range using the second physical memory block; and determining that the undo logging operation failed; and responsive to determining that the undo logging operation failed, updating the at least one bit metadata data structure for the memory line from indicating that memory requests are to be serviced at the second physical memory block to indicate that memory requests are to be serviced at the first physical memory block.

In Example 20, the subject matter of Example 19 includes, wherein the memory device is a persistent memory device connected to a host using an interface configured for a Compute Express Link (CXL) protocol.

In Example 21, the subject matter of Examples 19-20 includes, wherein the operations further comprise: responsive to receiving the indication of the start of the undo logging operation and prior to receiving the write request, causing a cache of the memory line of a host device to be flushed.

In Example 22, the subject matter of Example 21 includes, wherein the method further comprises, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

In Example 23, the subject matter of Example 22 includes, wherein traversing the bit vector hierarchy from the first level to the metadata structure for the memory line comprises traversing the bit vector hierarchy using one of a depth-first search or a breadth-first search.

In Example 24, the subject matter of Examples 19-23 includes, wherein the operations of determining that the undo logging operation failed comprises receiving an indication to abort the undo logging operation from the application.

In Example 25, the subject matter of Examples 19-24 includes, wherein determining that the undo logging operation failed comprises detecting a device reset prior to a committal operation of the undo logging operation.

In Example 26, the subject matter of Example 25 includes, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

In Example 27, the subject matter of Examples 19-26 includes, wherein the metadata data structure includes an identifier of whether the first or second physical block is a backup block.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

What is claimed is:
1. A method comprising:
receiving, from an application, an indication of a start of an undo logging operation, the indication of the start of the undo logging operation identifying a first physical memory block of a memory device, the first physical memory block addressed by one or more memory lines;
responsive to receiving, from the application, the indication of the start of the undo logging operation:
receiving a write request for a memory address range assigned to the first physical memory block of the memory device;
responsive to the write request:
allocating a second physical memory block of the memory device;
updating at least one bit of a metadata data structure for the memory address range from indicating that memory requests are to be serviced at the first physical memory block to indicate that memory requests are to be serviced at the second physical memory block; and servicing the memory request for the memory address range using the second physical memory block; and determining that the undo logging operation failed; and responsive to determining that the undo logging operation failed, updating the at least one bit of the metadata data structure for the memory line from indicating that memory requests are to be serviced at the second physical memory block to indicate that memory requests are to be serviced at the first physical memory block.

2. The method of claim 1, wherein the memory device is a persistent memory device connected to a host using an interface configured for a Compute Express Link (CXL) protocol.

3. The method of claim 1, wherein the method further comprises: responsive to receiving the indication of the start of the undo logging operation and prior to receiving the write request, causing a cache of the memory line of a host device to be flushed.

4. The method of claim 3, wherein the method further comprises, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

5. The method of claim 4, wherein traversing the bit vector hierarchy from the first level to the metadata structure for the memory line comprises traversing the bit vector hierarchy using one of a depth-first search or a breadth-first search.

6. The method of claim 1, wherein determining that the undo logging operation failed comprises receiving an indication to abort the undo logging operation from the application.

7. The method of claim 1, wherein determining that the undo logging operation failed comprises detecting a device reset prior to a committal operation of the undo logging operation.

8. The method of claim 7, further comprising, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

9. The method of claim 1, wherein the metadata data structure includes an identifier of whether the first or second physical block is a backup block.

10. A computing device comprising:
a processor;
a memory, storing instructions, which when executed by the processor causes the computing device to perform operations comprising:
receiving, from an application, an indication of a start of an undo logging operation, the indication of the start of the undo logging operation identifying a first physical memory block of a memory device, the first physical memory block addressed by one or more memory lines;

responsive to receiving, from the application, the indication of the start of the undo logging operation:
receiving a write request for a memory address range assigned to the first physical memory block of the memory device;
responsive to the write request:
allocating a second physical memory block of the memory device;
updating at least one bit of a metadata data structure for the memory address range from indicating that memory requests are to be serviced at the first physical memory block to indicate that memory requests are to be serviced at the second physical memory block; and
servicing the memory request for the memory address range using the second physical memory block; and
determining that the undo logging operation failed; and
responsive to determining that the undo logging operation failed, updating the at least one bit metadata data structure for the memory line from indicating that memory requests are to be serviced at the second physical memory block to indicate that memory requests are to be serviced at the first physical memory block.

11. The computing device of claim 10, wherein the memory device is a persistent memory device connected to a host using an interface configured for a Compute Express Link (CXL) protocol.

12. The computing device of claim 10, wherein the operations further comprise:
responsive to receiving the indication of the start of the undo logging operation and prior to receiving the write request, causing a cache of the memory line of a host device to be flushed.

13. The device of claim 12, wherein the operations further comprise, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

14. The device of claim 13, wherein traversing the bit vector hierarchy from the first level to the metadata structure for the memory line comprises traversing the bit vector hierarchy using one of a depth-first search or a breadth-first search.

15. The computing device of claim 10, wherein the operations of determining that the undo logging operation failed comprises receiving an indication to abort the undo logging operation from the application.

16. The computing device of claim 10, wherein determining that the undo logging operation failed comprises detecting a device reset prior to a committal operation of the undo logging operation.

17. The computing device of claim 16, further comprising, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

18. The computing device of claim 10, wherein the metadata data structure includes an identifier of whether the first or second physical block is a backup block.

19. A non-transitory machine-readable medium, storing instructions, which when executed by a machine causes the machine to perform operations comprising:
receiving, from an application, an indication of a start of an undo logging operation, the indication of the start of the undo logging operation identifying a first physical memory block of a memory device, the first physical memory block addressed by one or more memory lines;
responsive to receiving, from the application, the indication of the start of the undo logging operation:
receiving a write request for a memory address range assigned to the first physical memory block of the memory device;
responsive to the write request:
allocating a second physical memory block of the memory device;
updating at least one bit of a metadata data structure for the memory address range from indicating that memory requests are to be serviced at the first physical memory block to indicate that memory requests are to be serviced at the second physical memory block; and
servicing the memory request for the memory address range using the second physical memory block; and
determining that the undo logging operation failed; and
responsive to determining that the undo logging operation failed, updating the at least one bit metadata data structure for the memory line from indicating that memory requests are to be serviced at the second physical memory block to indicate that memory requests are to be serviced at the first physical memory block.

20. The non-transitory machine-readable medium of claim 19, wherein the memory device is a persistent memory device connected to a host using an interface configured for a Compute Express Link (CXL) protocol.

21. The non-transitory machine-readable medium of claim 19, wherein the operations further comprise: responsive to receiving the indication of the start of the undo logging operation and prior to receiving the write request, causing a cache of the memory line of a host device to be flushed.

22. The non-transitory machine-readable medium of claim 21, wherein the method further comprises, prior to causing the cache of the memory line of the host device to be flushed, identifying a set of one or more memory lines of the host device to be flushed, the memory line included in the set of one or more memory lines by traversing a bit vector hierarchy from a first level to the metadata structure for the memory line.

23. The non-transitory machine-readable medium of claim 22, wherein traversing the bit vector hierarchy from the first level to the metadata structure for the memory line comprises traversing the bit vector hierarchy using one of a depth-first search or a breadth-first search.

24. The non-transitory machine-readable medium of claim 19, wherein the operations of determining that the undo logging operation failed comprises receiving an indication to abort the undo logging operation from the application.

25. The non-transitory machine-readable medium of claim 19, wherein determining that the undo logging operation failed comprises detecting a device reset prior to a committal operation of the undo logging operation.

26. The non-transitory machine-readable medium of claim 25, further comprising, responsive to receiving, from the application, the indication of the start of the undo logging operation, recording the undo logging operation within a restore data structure, and wherein responsive to determining that the undo logging operation did not complete successfully comprises reading the undo logging operation from the restore data structure, the restore data structure storing an identifier of the first physical memory block.

27. The non-transitory machine-readable medium of claim 19, wherein the metadata data structure includes an identifier of whether the first or second physical block is a backup block.

* * * * *